United States Patent Office 3,553,154
Patented Jan. 5, 1971

3,553,154
POLYTRIMELLITAMIDE SOLUTIONS FOR WIRE COATING
Jerome A. Preston and Harold R. Otis, Fort Wayne, Ind., assignors to Essex International, Inc., a corporation of Michigan
No Drawing. Filed Nov. 1, 1968, Ser. No. 772,809
Int. Cl. C08g 51/26
U.S. Cl. 260—30.2                    2 Claims

ABSTRACT OF THE DISCLOSURE

A relatively low cost solution for application to magnet wire, containing polytrimellitamide polymer and a solvent therefor consisting of 30–80 weight percent N-methyl pyrrolidone and the remainder cyclohexanone. The solution is baked on the wire at above 250° C. to form a smooth, uniformly thick polyamide-imide coating.

---

This invention relates to improved solutions of polytrimellitamide polymers and their application to wire as an insulating coating.

Polytrimellitamide polymers are well known as "enamel" insulating coatings for magnet wire. These polymers are produced by reacting an acid halide of a benzene tricarboxylic acid anhydride such as the acid chloride of trimellitic anhydride and an organic diamine such as p,p'-oxybis (aniline) or p-p'methylenebis (aniline). The reaction product is a polyamide having some polyimide linkages, which upon heating is converted by polymerization to a polyamide-imide. The first polyamide reaction product is soluble in organic polar solvents such as N,N-dimethyl acetamide, N,N-dimethyl formamide, N,N-dimethyl sulfoxide, and N-methyl pyrrolidone. The liquid solution of the polyamide is applied to the metal wire and baked to convert the polymer to a hard, infusible, insoluble coating.

The above-mentioned organic polar solvents are very expensive and, of course, during the baking or polymerization process they are volatilized in the baking oven and discarded. To reduce the cost of the solvent, it has been proposed heretofore to dilute the amine polar solvents with much cheaper petroleum hydrocarbons. We have found that frequently these solutions present problems in processing the wire under factory conditions to produce a smooth, uniformly thick insulating coating. It appears that the petroleum solvent used commercially to dilute the expensive polar solvents contains many fractions boiling over a range of 165° to 250° C. The volume of solvent evolved is not uniform as the baking temperature rises. When wire carrying the solution is baked at a temperature above 250° C., the lower boiling fractions of the hydrocarbon flash off quickly to form a skin on the surface of the solution, thus trapping the higher boiling solvents in the solution beneath. As the higher boiling fractions of the hydrocarbon and the organic polar solvent, usually N-methyl pyrrolidone, are evaporated, the skin is broken and blisters form in the polymer on the surface of the wire. Further blistering may occur when the very high boiling fractions of the hydrocarbons are volatilized as the baking temperature increases. Simultaneously, the polymerization reaction is progressing and the polymer hardens in the blistered form. Wire with blistered coatings cannot be wound readily on bobbins to form coils and the insulating qualities are poor.

It is possible to regulate the temperature prevailing within the oven to compensate for non-uniform solvent evaporation, but this is inconvenient and costly. The same ovens are used to bake a variety of enamel coating compositions successively or even simultaneously. Therefore, the coating solutions must be compounded to complement an established temperature gradient within the production ovens. Typically, the temperature in a vertically disposed oven will range from 150° C. at the bottom, where the wire enters, to 700° C. at the top, where the wire exits. Ideally, the solvent of the polymer solution should evaporate uniformely over the established temperature raange so the polymer in the solution flows downwardly counter to the wire ascending in the vertically disposed oven. Causing the polymer to flow slightly provides a smooth, uniform, non-wavy film on the surface of the wire and the polymer then quickly sets in this smooth condition.

It has been proposed heretofore to modify polytrimellitamide solutions to achieve a smooth, non-blistering polymer coating on wire. For example, see U.S. Pat. 3,-320,202 issued May 16, 1967. In accordance with this patent, the objective is achieved only by incorporating with the N-methyl pyrrolidone or N,N-dimethyl acetamide, expensive co-solvents such as acetamide, acetanilide, or quinoline. N,N-dimethyl acetamide is too toxic for plant use and decomposes to pollute the atmosphere. N-methyl pyrrolidone has a tendency to blister because of its high boiling point and its viscosity is too high for best processing. These co-solvents are all nitrogen containing compounds and because of their chemical structure would be expected to be compatible with the polyamide polymers, if not solvents therefor.

We have found that a low cost solvent for the polytrimellitamide polymers can be prepared from a mixture of N-methyl pyrrolidone and cyclohexanone. Cyclohexanone is considered a weak solvent and one would not expect it to do the work of the strong organic polar solvents commonly used for dissolving these polymers and considered to be unique for this purpose. Polytrimellitamide polymers are not soluble in the usual organic solvents, for example, ketones, alcohols, or acetates. Certain organic acids will dissolve the polymers, but these react with the active imide groups and will cause gelation. Cyclohexanone, on the other hand, exhibits solvent action without reacting with the polymer to increase its viscosity. Furthermore, cyclohexanone sells for about one-third as much as N-methyl pyrrolidone, thus making it possible to reduce markedly the cost of the solvent for the solution. Most important, however, is the fact that the mixture of N-methyl pyrrolidone and cyclohexanone, during baking, evaporates at a rate which results in a very smooth, uniformly thick coating over the surface of the wire.

The amount of cyclohexanone added to N-methyl pyrrolidone will range up to 70 weight percent of the solvent mixture for polymer solutions having about 20% solids. It will be understood that for lower concentrations of polymer (more dilute solutions) the amount of cyclohexanone in the solvent may be increased. For example, at 15% solids the cyclohexanone may be as high as 80% of the solvent mix; at 30% solids, about 50%. Generally, cyclohexanone will constitute from 10%–80% of the solvent mix. If more than these maximum quantities are used, the evaporation which occurs during the baking becomes upset and the polymer coating is rough. As little as 10% cyclohexanone will improve the processability of the solution, but, of course, the cost saving is not nearly as great as where the major proportion of the solvent present is cyclohexanone. A mixture of equal proportions has been found to be very satisfactory for solutions of 20%–28% solids, commonly used for wire coating. The cost saving is substantial and the final wire product is smooth, uniform, and of high quality.

EXAMPLE 1

In carrying out our invention, 25 weight percent of a polytrimellitamide polymer resulting from the reaction of the acid chloride of trimellitic anhydride and p-p'-methylenebis (aniline) is added to 75 weight percent of the solvent mixture with agitation at room temperature. The solvent mixture is a blend of 35 weight percent N-methyl pyrrolidone and 65 weight percent cyclohexanone. The 25 weight percent of resin solids results in a solution having a viscosity of from 1500 to 1800 centipoises. If it is desired to accelerate the rate of solution, the solvent may be heated. The smooth, free-flowing solution thus produced was put in a conventional wire applicator and wire having a base coat of polyester resin was passed through the solution and into a vertical elongated oven maintained at a temperature of 260° C. at the bottom and increasing gradually to about 410° C. at the top where the wire exits. The polymer solution polymerized to a hard, smooth, uniform film of polyamide-imide which showed remarkable heat-shock resistance, meeting all requirements for Class H magnet wire.

The N-methyl pyrrolidone has a boiling point of 202° C. which volatilizes after the cyclohexanone, having a boiling point of 156° C. We have found, however, that if the cyclohexanone is increased to, say, 70% or more of the solvent mixture, the polymer coating at 20% concentration becomes very rough and blistered because reduced solubility of the blend causes some polytrimellitamide polymer to precipitate and the solvent balance is upset so that blistering starts at this point. This will be clear from Example 4 below.

EXAMPLE 2

18 weight percent of a polytrimellitamide polymer resulting from the reaction of the acid halide of trimellitic anhydride and p,p'oxybis (aniline) is added to 82 weight percent of the solvent mixture with agitation at room temperature. The solvent mixture is a blend of 50 weight percent of N-methyl pyrrolidone and cyclohexanone. The wire was coated with the solution as in Example 1. The resultant coated wire was concentric and passed Class H requirements using a polyester base coat.

EXAMPLE 3

Example 2 is repeated using 16% polytrimellitamide polymer and 30% to 70% blend of N-methyl pyrrolidone and cyclohexanone making the remaining 84%. Wire was smooth and concentric.

EXAMPLE 4

Example 2 is repeated using 30% polytrimellitamide polymer and 30% to 70% blend of N-methyl pyrrolidone and cyclohexanone comprising the remaining 70% of the solution. Wire has blisters and is rough because at 30% concentration, the proportion of N-methyl pyrrolidone is not high enough to dissolve all the polymer. At lower polymer concentrations, higher proportions of the cyclohexanone in the solvent are operable.

Although this invention has been described primarily in connection with polytrimellitamide polymers, it will be understood that small quantities of other resins may be used to modify the characteristics of the final baked polymer, providing these added resins are soluble in the solvents and do not reduce the heat-shock resistance of polyamide-imide resin. Such resins include linear and trifunctional silicones, polyesters, polyester-imides, and polyhydantoin. It is also possible to modify the solvent by adding relatively small quantities or aromatic hydrocarbons, such as those commonly sold on the market derived from petroleum. It is preferred to use N-methyl pyrrolidone and cyclohexanone without added hydrocarbons, but the advantages of the invention are not avoided by the presence of small quantities of the hydrocarbons. In any event, if the amount of hydrocarbon reaches 10 percent of the solvent solution by weight, the polytrimellitamide polymer will tend to precipitate or jell. Diluent solvents therefore should be added in quantities of not more than about 5 percent.

From the foregoing, it will appear that we have provided a novel solvent mixture which is inexpensive and which results in a smooth, uniform coating of polyamide-imide resin on the surface of the wire.

What is claimed is:

1. A wire enamel coating solution characterized by forming smooth, uniformly thick coverings when baked on the wire comprising from 1 to 40 weight percent of polytrimellitamide polymer in an organic solvent, said solvent containing from 10 to 80 weight percent N-methyl pyrrolinone and the remainder essentially cyclohexanone.

2. The solution of claim 1 in which said N-methyl pyrrolidone constitutes from 35 to 50 weight percent of the solvent.

References Cited

UNITED STATES PATENTS

| 3,069,379 | 12/1962 | Lavin et al. | 117—128.4X |
| 3,316,211 | 4/1967 | Angelo | 260—30.2X |
| 3,320,202 | 5/1967 | Bolton et al. | 260—32.6(N)X |
| 3,451,848 | 6/1969 | Stephens | 117—128.4X |

FOREIGN PATENTS

| 6,516,652 | 6/1966 | Netherlands | 260—30.2 |

MORRIS LIEBMAN, Primary Examiner

L. T. JACOBS, Assistant Examiner

U.S. Cl. X.R.

260—32.8